(12) United States Patent
Li

(10) Patent No.: US 10,724,419 B2
(45) Date of Patent: Jul. 28, 2020

(54) TECHNIQUE AND METHOD TO MEASURE AND CALCULATE PARTICULATES OUTPUT FROM GASOLINE ENGINES

(71) Applicant: GM Global Technology Operations LLC, Detroit, MI (US)

(72) Inventor: Sharon Xiaobin Li, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 233 days.

(21) Appl. No.: 15/833,234

(22) Filed: Dec. 6, 2017

(65) Prior Publication Data

US 2019/0170048 A1  Jun. 6, 2019

(51) Int. Cl.
| | | |
|---|---|---|
| *F01N 11/00* | (2006.01) | |
| *F01N 9/00* | (2006.01) | |
| *G01M 15/10* | (2006.01) | |
| *F02D 41/14* | (2006.01) | |
| *F02D 41/06* | (2006.01) | |

(52) U.S. Cl.
CPC ............ *F01N 11/007* (2013.01); *F01N 9/002* (2013.01); *F01N 9/005* (2013.01); *F01N 11/00* (2013.01); *F02D 41/064* (2013.01); *F02D 41/1467* (2013.01); *G01M 15/102* (2013.01); *F01N 2550/04* (2013.01); *F01N 2900/04* (2013.01); *F01N 2900/08* (2013.01); *F01N 2900/10* (2013.01); *F01N 2900/1602* (2013.01); *F01N 2900/1606* (2013.01); *F01N 2900/1631* (2013.01); *F02D 2200/0802* (2013.01); *F02D 2200/0812* (2013.01); *Y02T 10/20* (2013.01)

(58) Field of Classification Search
CPC ........ F01N 11/007; F01N 9/005; F01N 9/002; F01N 11/00; F01N 2900/1602; F01N 2900/04; F01N 2900/1631; F01N 2900/10; F01N 2900/1606; F01N 2900/08; F02D 41/064; F02D 41/1467; F02D 2200/0812; F02D 2200/0802; G01M 15/102; Y02T 10/20
See application file for complete search history.

(56) References Cited

U.S. PATENT DOCUMENTS

2009/0151330 A1\* 6/2009 Chamarthi .............. F01N 9/002
                                                                    60/286
2013/0312719 A1\* 11/2013 Mikashima ......... F02D 41/0055
                                                                    123/568.21

OTHER PUBLICATIONS

Badshah, 2016, Particle Emissions from Light-Duty Vehicles during Cold-Cold Start, SAE International (Year: 2016).\*

\* cited by examiner

*Primary Examiner* — Eric S. McCall
*Assistant Examiner* — Timothy P Graves

(57) ABSTRACT

A method to determine soot mass of a gasoline engine powered automobile vehicle includes: predefining a time period between approximately 50 seconds to 200 seconds defining a cold start operation of a gasoline engine; determining a critical engine cold start temperature at a time defining a start of the cold start operation; identifying a cold start soot mass value from a lookup table based on the predefined time period and the critical engine cold start temperature; calculating a hot engine soot mass value for a hot engine operating time; repeating the calculating step for at least one next successive hot engine operating time; and adding the cold start soot mass value to the hot engine soot mass value for the hot engine operating time and the at least one next successive hot engine operating time to define a total soot mass value.

13 Claims, 4 Drawing Sheets

TECHNIQUE AND METHOD TO MEASURE AND CALCULATE PARTICULATES OUTPUT FROM GASOLINE ENGINES

INTRODUCTION

The present disclosure relates to determining soot output from gasoline engines.

Known and pending requirements for automobile gasoline engine powered vehicles to monitor and control soot output may require a soot filter to filter and trap engine soot discharged over time. To avoid replacement of the soot filter a procedure to burn off soot on a periodic basis may be used. Present methods to burn off soot require operation at high temperature and require increased fuel consumption. It is therefore important to accurately calculate soot accumulation and to minimize soot burn operations. Known methods to calculate soot output utilize hot operational engine data from engine mapping curves which is generally available from dynamometer testing. Engine-out soot data is traditionally generated with coolant temperature settings set at a desired temperature. This data generation is time consuming and cannot capture the transient nature of soot emissions. For example, this data does not accurately account for soot output during cold engine startups, which can account for up to 90% of total engine soot output.

Cold engine start conditions occur at engine temperatures generally below approximately 70 degrees Celsius. Cold start soot output is caused by fuel adhesion to cold pistons, with subsequent delayed evaporation and incomplete burn of this fuel. Cold start soot output is highest at the lowest ambient start temperatures, for example below zero degrees Celsius down to approximately −30 degrees Celsius. At present, steady state or hot engine dynamometer test data does not accurately map cold start soot data.

Thus, while current soot mass determination systems and methods achieve their intended purpose, there is a need for a new and improved system and method for soot mass determination.

SUMMARY

According to several aspects, a method to determine soot mass of a gasoline engine powered automobile vehicle includes: predefining a time period for a cold start operation of an engine; determining a critical engine temperature at a time defining a start of the cold start operation; identifying a cold start soot mass value from a lookup table based on the predefined time period and the critical engine temperature; calculating a hot engine soot mass value for at least one operating time period after an end of the time defining the start of the cold start operation and before a time of engine shutoff; and adding the cold start soot mass value to the hot engine soot mass value to define a total soot mass value.

In another aspect of the present disclosure, the method further includes identifying a set of driving conditions ranging between a steady state and an aggressive state.

In another aspect of the present disclosure, the method further includes determining an aggressiveness factor C_ags for each of the driving conditions in the set of driving conditions present.

In another aspect of the present disclosure, the method further includes: identifying the driving conditions during the time period; and multiplying the hot engine soot mass value by one of the aggressiveness factors that substantially equates to the driving conditions present during the time period.

In another aspect of the present disclosure, the method further includes calculating the hot engine soot mass value as a product of a brake specific soot mass (BS_soot), an engine power (Pwr_avg), and a driving aggressiveness factor (C_ags).

In another aspect of the present disclosure, the method further includes deriving the BS_soot term from a hot-running soot characteristics curve generated using hot engine soot mapping data and saved in a lookup table.

In another aspect of the present disclosure, the method further includes determining the Pwr_avg term from an engine power averaged over a time period $\Delta t$.

In another aspect of the present disclosure, the method further includes selecting the time period $\Delta t$ within a range of approximately 5 to 20 seconds.

In another aspect of the present disclosure, the method further includes assigning a value ranging from 1.0 to 3.0 to the C_ags term defining a driving aggressiveness factor.

In another aspect of the present disclosure, the method further includes selecting approximately 50 to 200 seconds as the time period defining the cold start operation of the engine.

According to several aspects, a method to determine soot mass of a gasoline engine powered automobile vehicle includes: predefining a time period between approximately 50 seconds to 200 seconds defining a cold start operation of a gasoline engine; determining an engine coolant temperature at a time defining a start of the cold start operation; identifying a cold start soot mass value from a lookup table based on the predefined time period and the engine coolant temperature; calculating a hot engine soot mass value for a hot engine operating time; repeating the calculating step for at least one next successive hot engine operating time; and adding the cold start soot mass value to the hot engine soot mass value for the hot engine operating time and the at least one next successive hot engine operating time to define a total soot mass value.

In another aspect of the present disclosure, the method further includes saving the total soot mass value in a memory at an engine shut off time.

In another aspect of the present disclosure, the method further includes the at least one next successive hot engine operation time defining multiple hot engine operation times with the repeating step continuing until an engine shutoff time occurs.

In another aspect of the present disclosure, the method further includes entering a lookup table during the calculating step having a graph providing a hot engine soot mapping data characteristics curve.

In another aspect of the present disclosure, the method further includes creating the hot engine soot mapping data characteristics curve as an exponential curve of hot soot mass values as a function of engine power, the air to fuel ratio, and engine operating parameters including a fuel injection pressure and a crank angle as the fuel is being injected during normal engine operating periods.

In another aspect of the present disclosure, the method further includes obtaining the hot engine soot mass value at an intersection of the hot engine soot mapping data characteristics curve and an engine power level.

In another aspect of the present disclosure, the method further includes performing the calculating step by multiplying a hot engine soot term, an engine power average term, and a driving aggressiveness term.

According to several aspects, a soot mass determination system for a gasoline engine powered automobile vehicle includes a cold start operation of a gasoline engine having a predefined time period between approximately 50 seconds to 200 seconds. An engine coolant temperature is determined at a time defining a start of the cold start operation. A cold start soot mass value is identified from a lookup table based on the predefined time period and engine temperatures including a piston surface temperature, ambient temperature, coolant temperature and oil temperature. A hot engine soot mass value is calculated for a hot engine operating time and for at least one next successive hot engine operating time. A total soot mass value is identified by adding the cold start soot mass value to the hot engine soot mass value for the hot engine operating time and the at least one next successive hot engine operating time.

In another aspect of the present disclosure, a lookup table during the calculating step has a graph providing a hot engine soot mapping data characteristics curve, the hot engine soot mapping data characteristics curve defining an exponential curve of hot soot mass values as a function of engine power, the air to fuel ratio, and engine operating parameters including fuel injection pressure and a crank angle as the fuel is being injected during normal engine operating periods.

In another aspect of the present disclosure, the hot engine soot mass value includes a hot engine soot term, an engine power average term, and a driving aggressiveness term.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
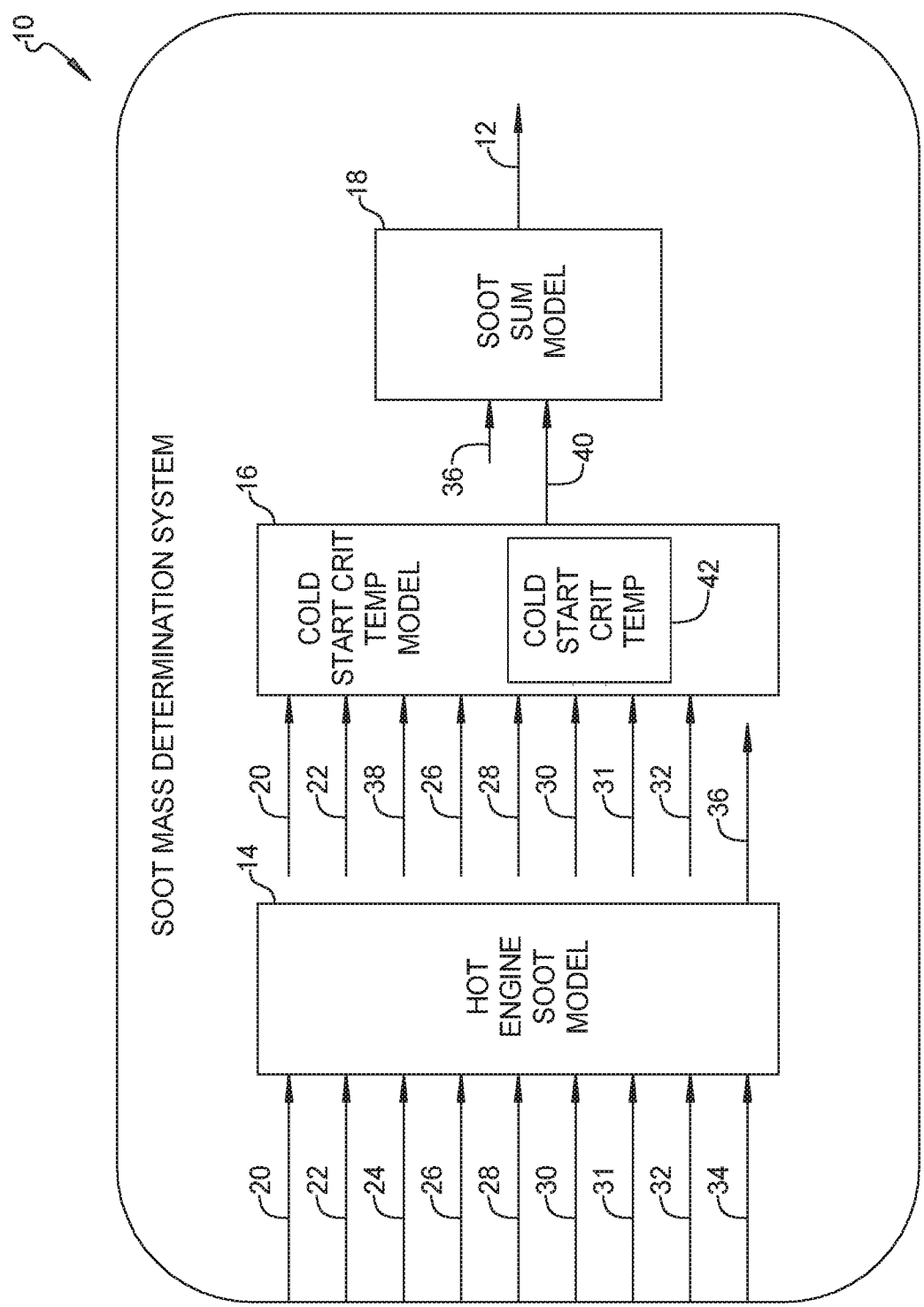
FIG. 1 is a diagrammatic presentation of a soot mass determination system and method according to an exemplary embodiment.

Referring to FIG. 1, a soot mass determination system 10 for a gasoline engine powered automobile vehicle divides a calculation of a total soot mass value (SM) 12 generated by the vehicle engine into a first mass identified from a hot running portion of engine operation using a hot engine soot model 14 and a second mass identified from a cold running portion of engine operation using a cold start critical temperature model 16. The total soot mass value 12 is then determined from a soot summation model 18 as a sum of the soot mass identified by the hot engine soot model 14 and the soot mass identified by the cold start critical temperature model 16.

The hot engine soot model 14 uses as input variables an engine speed 20, a measured air per cylinder 22, a cold start state 24, a vehicle speed 26, an engine coolant temperature 28, an engine oil temperature 30, an ambient temperature 31, a piston temperature 32, and an engine power 34. From these variables, the hot engine soot model 14 generates a hot engine soot mass value 36.

The cold start critical temperature model 16 uses as input variables the engine speed 20, the measured air per cylinder 22, a cold start active variable 38, the vehicle speed 26, the engine coolant temperature 28, the engine oil temperature 30, the ambient temperature 31, and the piston temperature 32. From these variables, the cold start critical temperature model 16 generates a cold start soot mass SM_cldst 40.

The soot summation model 18 sums the hot engine soot mass value 36 and the cold start soot mass value SM_cldst 40 to identify the total soot mass value (SM) 12. The total soot mass value SM(t+Δt) 12 over a predetermined period of time is calculated by the soot summation model 18 using the following equation:

$$SM(t+\Delta t) = (SM\_cldst) + (BS\_soot * Pwr\_avg * C\_ags * \Delta t)$$

where:
1. SM_cldst or the cold start soot mass 40 is determined as a function of a cold start critical temperature 42 at cold start as will be described in reference to FIG. 2 and FIG. 3.
2. BS_soot*Pwr_avg*Δt*C_ags defines the hot engine soot mass 36, where:
    a. the BS_soot term is derived from a hot-running soot characteristics curve BS_soot vs. power and other engine operating parameters which is generated using hot engine soot mapping data as described in reference to FIG. 4.
    b. the Pwr_avg term is an engine power averaged over a time period Δt, with the time period Δt being within a range of approximately 5 to 20 seconds.
    c. the C_ags term is a driving aggressiveness term determined from an adjustment table using hot vehicle emission cycle data to test and adjust the data, which is a function of a standard deviation of the engine power. Values for the driving aggressiveness term range from 1.0 up to 3.0. The driving aggressiveness term is used to increase the hot engine soot mass total when the driver operates the engine in an aggressive, rapid acceleration and rapid deceleration manner during the time period Δt, which increases soot mass formation over the time period Δt compared to operation in a steady manner over a comparable time period Δt. The hot vehicle emission cycle data can be used to test and adjust a driving aggressiveness adjustment table providing values for the C_ags term which is a function of the standard deviation of the engine power.
3. Δt defines a time period in seconds over which the total soot mass (SM) 12 is calculated.

Figure 2:
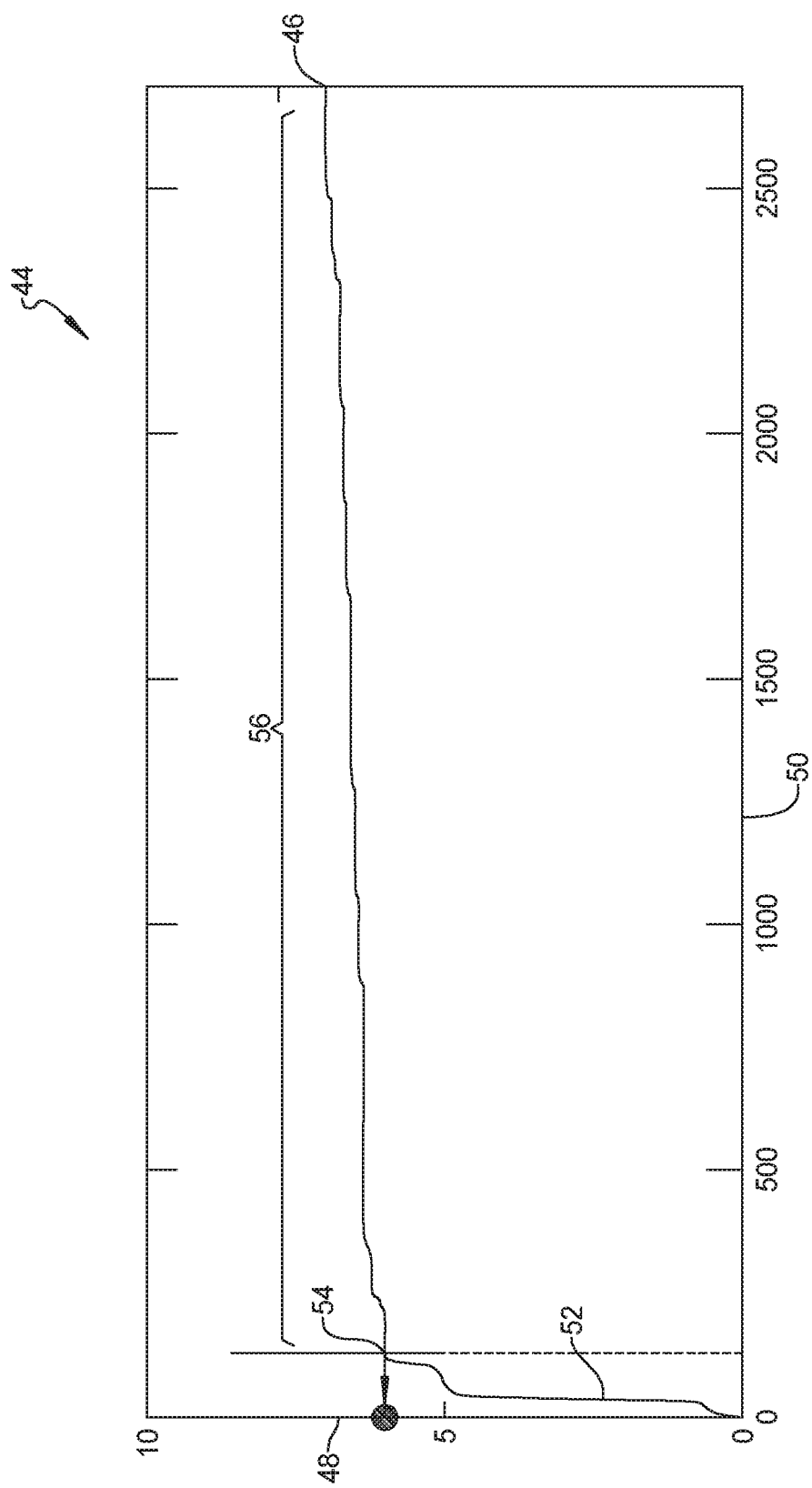
FIG. 2 is a graph presenting cold start soot mass accumulation versus engine running time in seconds.

Referring to FIG. 2 and again to FIG. 1, a graph 44 provides multiple curves 46 comparing soot mass 48 measured as a function of an engine running time 50 in seconds. It is evident from FIG. 2 that a first portion 52 defining a combination of the curves 46 reaches an initial peak 54 of soot mass of approximately 5.0 very rapidly, in approximately 100 seconds. The first portion 52 therefore defines a cold start period. A second portion 56 of the curves 46 indicate soot mass formation is substantially flat or increases very slowly with respect to the engine running time 50 beyond the initial operation period of approximately 100 seconds. The portion of the engine running time 50 beyond the initial operation period of approximately 100 seconds is therefore defined as hot running engine time. Soot mass accumulation during the cold start period is therefore assumed for the purpose of the present disclosure to occur substantially within a predefined time period from engine start to approximately 100 seconds, with the remaining soot mass input occurring during hot running engine conditions being substantially less. It is noted FIG. 2 is provided for an exemplary engine design, and the predefined time period up to approximately 100 seconds of engine run time following engine start for the cold start period can therefore vary above and below 100 seconds dependent on engine size and design. For example predefined time period for cold start times can vary from approximately 50 seconds up to approximately 200 seconds of engine run time.

Soot mass output is also calculated from two different parts based on an understanding of the different mechanisms that cause soot formation in cold conditions. In a first part, cold start soot mass SM_cldst is determined as noted above by summing soot mass accumulation in approximately the first 50 to 200 seconds after each cold start.

Referring to FIG. 3 and again to FIGS. 1 through 2, the cold start soot mass SM_cldst 40 is heavily dependent upon the engine starting temperature, which has a non-linear effect of soot emissions. Engine coolant outlet temperature is used as the critical cold start temperature in this example. Other critical engine temperatures, such as piston surface temperature could be more accurate. The cold start soot mass may be obtained from a lookup table containing cold start soot mass values for a predetermined engine design. The lookup table is populated from a graph 58 presenting an exponential curve 60 of cold start soot mass values as a function of the critical engine starting temperatures during cold start periods. The curve 60 is initially created as a curve fit function of multiple soot mass data points 62. The cold start soot mass 40 can be obtained at an intersection of the curve 60 and a given engine coolant starting temperature 64. It is noted that other engine temperatures such as oil gallery temperature and piston surface temperature may also correlate with cold start soot generation, and therefore may be used to further enhance determination of the cold start soot mass 40.

By computing the first 100 seconds, or another duration from 50 seconds to 200 seconds appropriate for the specific engine design, an accumulated soot mass is determined. This computation provides a correlation of SM_cldst vs critical cold start temperature. For each cold start event, given the engine coolant starting temperature a cold start soot mass output is determined from the SM_cldst lookup table and this amount is added to the value of total soot loading.

Figure 3:
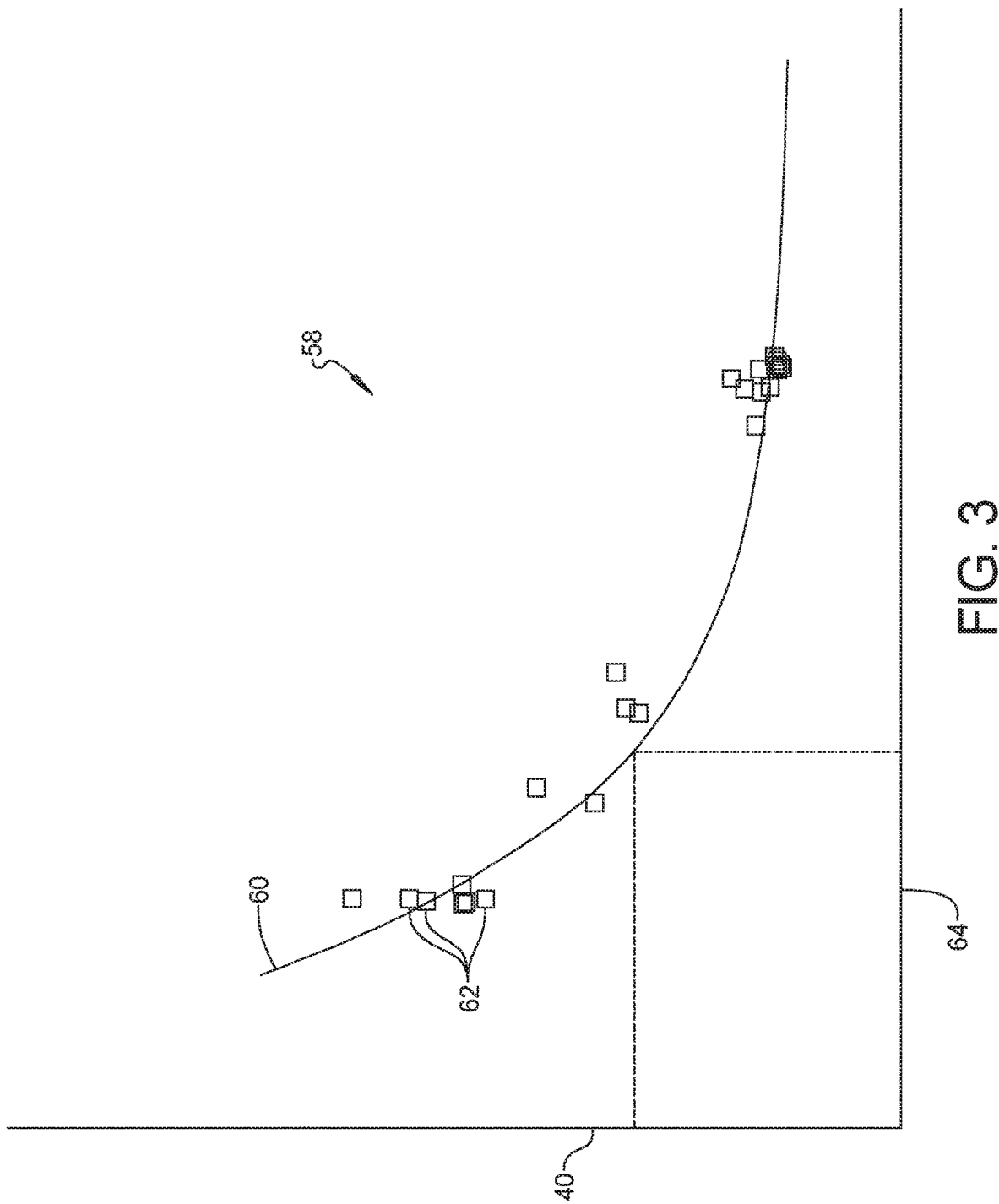
FIG. 3 is a graph presenting cold start soot mass accumulation versus engine coolant starting temperature.
Figure 4:
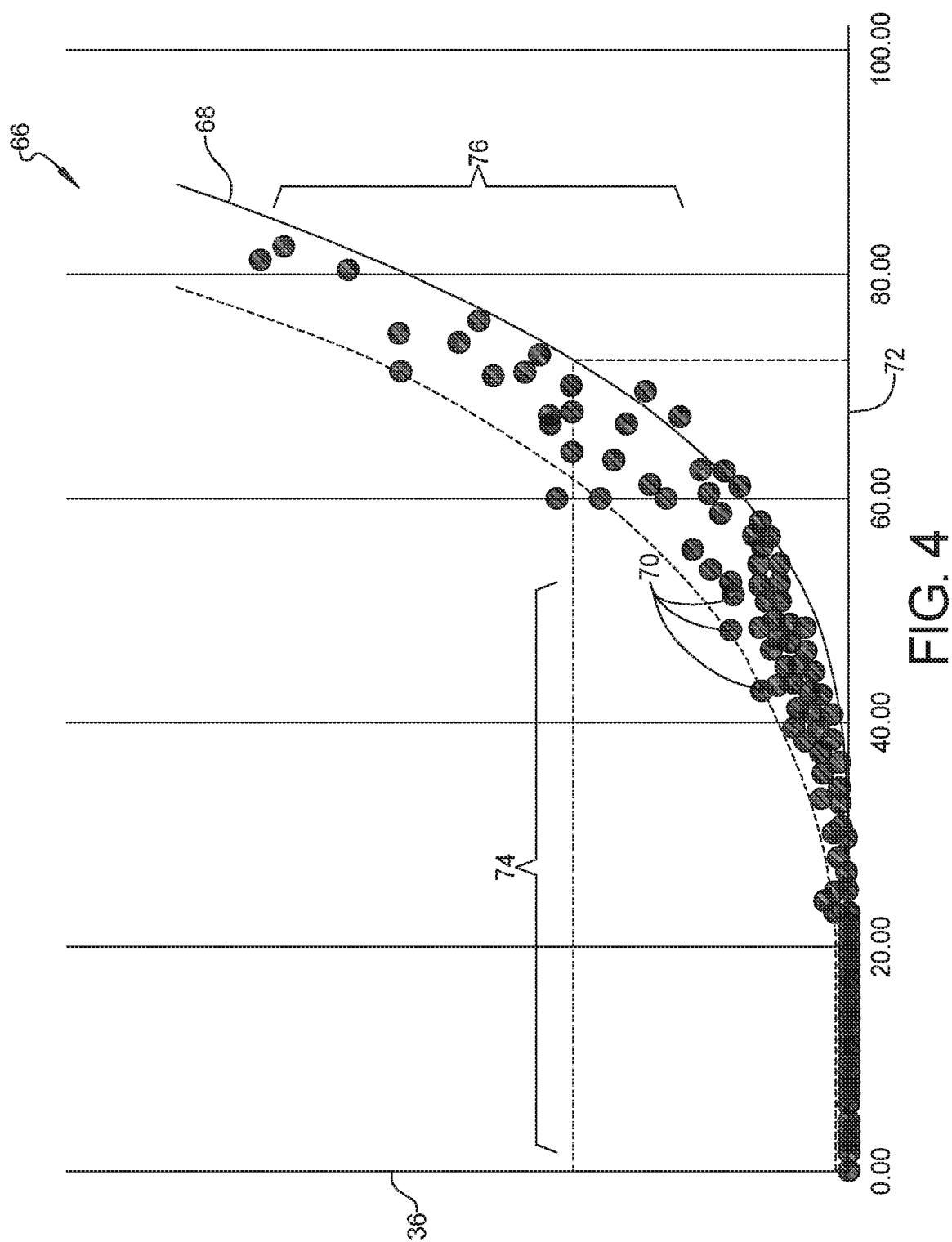
FIG. 4 is a graph presenting hot engine soot mass accumulation versus engine power.

Referring to FIG. 4 and again to FIGS. 1 through 3, similar to the determination of the cold start soot mass SM_cldst 40 using the graph 58, the hot engine soot mass 36 can be identified using a graph 66 providing hot engine soot mapping characteristics curves 68. The hot engine soot mapping characteristics curves 68 define exponential curves of hot soot mass values as a function of engine power during normal engine operating periods. The hot engine soot mapping characteristics curves 68 are initially created as curve fit functions of multiple soot mass data points 70. The hot engine soot mass 36 can be obtained at an intersection of the hot engine soot mapping characteristics curves 68 and a given engine power 72.

The hot engine soot mass value is calculated for a hot engine operating time. The calculating step is then repeated for at least one next successive hot engine operating time. After the next successive hot engine operating time the cold start soot mass value is added to the hot engine soot mass value for the hot engine operating time and the at least one next successive hot engine operating time to define the total soot mass value. The at least one next successive hot engine operation time may define multiple hot engine operation times and the repeating step continues until an engine shutoff time occurs.

A soot mass determination system for a gasoline engine powered automobile vehicle of the present disclosure offers several advantages. These include separating soot generation into cold-start and hot-running portions. A "lump sum" approach is applied to link soot generation to both a number or quantity of engine cold starts and a critical engine temperature at which each of the cold starts occurred. This permits a data best-fit approach to be used to estimate cold start soot totals over a predetermined period of cold start. Data from engine hot run mapping is then added to the total accumulation of soot calculated from the lump sum of cold starts to calculate a running soot total.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to determine soot mass of a gasoline engine powered automobile vehicle, comprising:
predefining a time period for a cold start operation of an engine;
determining an engine cold start critical temperature at a time defining start of the cold start operation;
identifying a cold start soot mass value from a lookup table based on the predefined time period and the engine cold start critical temperature;
calculating a hot engine soot mass value for at least one operating time period after an end of the time defining the start of the cold start operation and before a time of engine shutoff;
identifying a set of driving conditions ranging between a steady state and an aggressive state;
determining an aggressiveness factor C_ags for each of the driving conditions in the set of driving conditions present;
identifying the driving conditions during the time period;
multiplying the hot engine soot mass value by one of the aggressiveness factors that substantially equates to the driving conditions present during the time period; and
adding the cold start soot mass value to the hot engine soot mass value to define a total soot mass value.

2. The method to determine soot mass of a gasoline engine powered automobile vehicle of claim 1, further including calculating the hot engine soot mass value as a product of a brake specific soot mass (BS_soot), an engine power (Pwr_avg), and a driving aggressiveness factor (C_ags).

3. The method to determine soot mass of a gasoline engine powered automobile vehicle of claim 2, further including deriving the BS_soot term from a hot-running soot characteristics curve generated using hot engine soot mapping data and saved in a lookup table.

4. The method to determine soot mass of a gasoline engine powered automobile vehicle of claim 2, further including determining the Pwr_avg term from an engine power averaged over a time period $\Delta t$.

5. The method to determine soot mass of a gasoline engine powered automobile vehicle of claim 4, selecting the time period $\Delta t$ within a range of approximately 5 to 20 seconds.

6. The method to determine soot mass of a gasoline engine powered automobile vehicle of claim 2, further including assigning a value ranging from 1.0 to 3.0 to the C_ags term defining the driving aggressiveness factor.

7. The method to determine soot mass of a gasoline engine powered automobile vehicle of claim 1, further including selecting approximately 50 to 200 seconds as the time period defining the cold start operation of the engine.

8. A method to determine soot mass of a gasoline engine powered automobile vehicle, comprising:
predefining a time period between approximately 50 seconds to 200 seconds defining a cold start operation of a gasoline engine;
determining an engine coolant temperature at a time defining a start of the cold start operation;
identifying a cold start soot mass value from a lookup table based on the predefined time period and the engine coolant temperature;
calculating a hot engine soot mass value for a hot engine operating time by entering a lookup table having a graph providing a hot engine soot mapping data characteristics curve, wherein the hot engine soot mapping data characteristics curve as an exponential curve of hot soot mass values as a function of engine power, an air to fuel ratio, and engine operating parameters including a fuel injection pressure and a crank angle timing as fuel is being injected during normal engine operating periods;
repeating the calculating step for at least one next successive hot engine operating time; and
adding the cold start soot mass value to the hot engine soot mass value for the hot engine operating time and the at least one next successive hot engine operating time to define a total soot mass value.

9. The method to determine soot mass of a gasoline engine powered automobile vehicle of claim 8, further including saving the total soot mass value in a memory at an engine shut off time.

10. The method to determine soot mass of a gasoline engine powered automobile vehicle of claim 8, wherein the at least one next successive hot engine operation time defines multiple hot engine operation times with the repeating step continuing until an engine shutoff time occurs.

11. The method to determine soot mass of a gasoline engine powered automobile vehicle of claim 8, further including obtaining the hot engine soot mass value at an intersection of the hot engine soot mapping data characteristics curve and an engine power level.

12. A soot mass determination system for a gasoline engine powered automobile vehicle, comprising:
a cold start operation of a gasoline engine having a predefined time period between approximately 50 seconds to 200 seconds;
an engine cold start critical temperature determined at a time defining a start of the cold start operation;
a cold start soot mass value identified from a lookup table based on the predefined time period and the engine cold start critical temperature including a piston surface temperature, an ambient temperature, a coolant temperature, and an oil temperature;
a hot engine soot mass value calculated for a hot engine operating time and for at least one next successive hot engine operating time; and
a total soot mass value identified by adding the cold start soot mass value to the hot engine soot mass value for the hot engine operating time and the at least one next successive hot engine operating time.

13. The soot mass determination system for a gasoline engine powered automobile vehicle of claim 12, further including a multi-dimensional lookup table during the calculating step providing a hot engine soot mapping data characteristics curves, the hot engine soot mapping data characteristics curves defining a group of exponential curves of hot soot mass values as functions of engine power, a fuel to air ratio, an engine speed, a fuel injection pressure and a start of injection timing.

* * * * *